United States Patent [19]

Gilligan et al.

[11] 4,003,977

[45] Jan. 18, 1977

[54] REMOVAL OF TETRANITROMETHANE FROM TNT PLANT WASTE GASES

[75] Inventors: William H. Gilligan, Washington, D.C.; Thomas N. Hall, Adelphi, Md.

[73] Assignee: The United States of America as represented by the Secretary of the Navy, Washington, D.C.

[22] Filed: Aug. 18, 1975

[21] Appl. No.: 605,778

[52] U.S. Cl. .............................. 423/236; 423/245; 260/644; 260/645

[51] Int. Cl.² ......................................... B01D 53/34

[58] Field of Search ........... 423/236, 245; 260/644, 260/645

[56] References Cited

UNITED STATES PATENTS

| | | | |
|---|---|---|---|
| 1,632,959 | 6/1927 | Gartner | 260/644 |
| 3,125,606 | 3/1964 | Glover et al. | 260/644 |

OTHER PUBLICATIONS

Schultheiss, "Report on Work in Connection with Explosives", PB 91741, B.I.O.S. 5741, 1945, pp. 7/I and 8/I relied upon.

*Primary Examiner*—Earl C. Thomas
*Attorney, Agent, or Firm*—R. S. Sciascia; A. L. Branning; R. D. Johnson

[57] ABSTRACT

A method of removing tetranitromethane from waste gases (e.g., from trinitrotoluene plants) by scrubbing the waste gases with a mixture of (1) an alkali metal hydroxide, (2) water, and (3) a liquid alcohol. Most of the tetranitromethane is converted into a soluble alkali metal salt of trinitromethane.

21 Claims, No Drawings

REMOVAL OF TETRANITROMETHANE FROM TNT PLANT WASTE GASES

BACKGROUND OF THE INVENTION

Untreated waste gases generated in the manufacture of trinitrotoluene contain tetranitromethane and various nitrogen oxides as pollutants. The prior art procedures are to scrub these waste gases with water and concentrated sulfuric acid, removing the nitrogen oxides but not the tetranitromethane. The treated waste gases, which still contain tetranitromethane, are then discharged into the atmosphere. However, it has been determined that tetranitromethane is an undesirable pollutant which should be removed from the waste gases before they are vented to the atmosphere.

Further, although processes for converting tetranitromethane into trinitromethane are known in the prior art, trinitromethane is still expensive and the supply is limited and erratic. For instance, one prior art process uses aqueous potassium hydroxide to prepare trinitromethane (nitroform) from tetranitromethane [see Schmidt, Ber. 52,400[1919]]. The usefulness of this process is reduced, however, by the simultaneous conversion of a part of the tetranitromethane to potassium carbonate with a corresponding reduction in the yield of the desired trinitromethane product in accordance with the following equations:

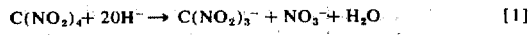
$$C(NO_2)_4 + 2OH^- \rightarrow C(NO_2)_3^- + NO_3^- + H_2O \qquad [I]$$

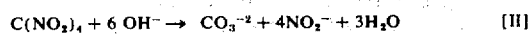
$$C(NO_2)_4 + 6 OH^- \rightarrow CO_3^{-2} + 4NO_2^- + 3H_2O \qquad [II]$$

The relative yields of the two sets of products formed in these competing reactions depend on the concentrations of tetranitromethane and of potassium hydroxide. The prior art states that unless very high concentrations (over 7 normal) of potassium hydroxide are used, the yield of trinitromethane will be less than 80 percent of the tetranitromethane present in the solution.

This prior art potassium hydroxide process is unsuitable for scrubbing waste gases. First, the aqueous potassium hydroxide solution is not efficient in removing tetranitromethane from waste gases because of the low solubility of the tetranitromethane in the solution. Second, high concentrations of hydroxide ion cause the product alkali metal trinitromethide to decompose. This decomposition may not be very noticeable in laboratory syntheses which take only a short time; however, in a scrubbing process where the product will be exposed to the high hydroxide concentrations (over about 3 N) for hours or even days at a time, most or all of the product will decompose. Yet, low concentrations will also provide poor efficiency and yield. For instance, 0.4 N to 0.5 N aqueous sodium hydroxide will remove only about half of the tetranitromethane from waste gases and convert only 75 percent of that to sodium trinitromethide.

In summary, an aqueous alkali metal hydroxide solution alone is inefficient in removing tetranitromethane and converting it into trinitromethane or its salts because (1) tetranitromethane is not very soluble in the aqueous alkali metal hydroxide solutions and (2) some of the tetranitromethane is converted into carbonate ions by a simultaneous side reaction. Therefore, it would be desirable to provide a process which would efficiently and economically remove tetranitromethane from waste gases and convert it into trinitromethane or its salts.

SUMMARY OF THE INVENTION

An object of this invention is to provide an efficient method for removing tetranitromethane from waste gases produced in the manufacture of trinitrotoluene.

Another object of this invention is to provide an economical source of trinitromethane.

Yet another object of this invention is to provide a reliable source of trinitromethane.

These and other objects of this invention are accomplished by scrubbing exhaust gases containing tetranitromethane with a mixture comprising (1) an alkali metal hydroxide, (2) water, and (3) a liquid alcohol.

DETAILED DESCRIPTION OF THE PREFERRED EMBODIMENT

A standard gas scrubber may be used in the practice of this invention. A liquid scrubbing mixture is cycled through the scrubber and the waste gases are passed through the scrubber countercurrent to the scrubbing mixture. Usually, this involves allowing the liquid scrubbing mixture to flow down through the scrubbing column while the exhaust gases flow up through the column. The scrubbing process will normally be carried out at outdoor ambient temperatures using a pump to circulate the scrubbing mixture. Obviously, the mixture should not be exposed to outdoor ambient temperatures which will freeze any part of the mixture.

The scrubbing mixture comprises water, an alkali metal hydroxide, and an alcohol. This mixture will be a single phase solution when a water soluble alcohol is used, but a two phase mixture when a water insoluble or partially soluble alcohol is used.

The alkali metal hydroxide (i.e., LiOH, NaOH, KOH, CsOH, or RbOH) is used as the hydroxyl ion source for the process of this invention. Of these NaOH and KOH are preferred because they are least expensive. Sodium hydroxide is more preferred because the salt sodium trinitromethane is much more soluble in water than potassium trinitromethane is. The greater solubility of the sodium trinitromethane permits a more highly concentrated aqueous solution of trinitromethane which is more economical to transport and convert into trinitromethane.

While any basic solution will be operable to some extent, a hydroxyl ion concentration of from about 0.1 N to about 3 N is preferred, with a concentration of from 0.5 to 1 N being more preferred. A fairly high hydroxyl ion concentration is required for the formation of the alkoxy ions which are of primary importance to the present invention. On the other hand, increasing the hydroxyl ion concentration to above 1 N will not improve the process very much and, in fact, hydroxyl ion concentrations above 3 N will probably cause some of the sodium trinitromethide salt to decompose.

During the scrubbing process, the hydroxyl ion concentration will be continuously reduced in two ways. First, hydroxylions are used up in the conversion of alcohol molecules into alkoxy ions; the alkoxy ions, in turn, are used up in the conversion of tetranitromethane into the trinitromethide ion, $C(NO_2)_3^-$ (see equation III). Second, the very basic scrubbing solutions used in the present invention also remove carbon dioxide from the waste gases. As the carbon dioxide accumulates, some of the alkali metal hydroxide is converted into alkali metal carbonate, a weaker base. As a result of these two factors, the alkali metal hydroxide must be replenished during the scrubbing operation.

In the discussions which follow the term "efficiency" refers to the percentage of tetranitromethane which is removed from the waste gases during the scrubbing process; the term "yield" refers to the percentage of tetranitromethane which is removed from the waste gases and converted into trinitromethane or one or its salts.

As stated in the background of the invention, if an aqueous alkali metal hydroxide solution is used alone, the efficiency and yield of the scrubbing process will be low. However, the efficiency of the alkali hydroxide scrubbing solutions can be increased in several ways. The first method is to add a water soluble ether (e.g., 2,2-dimethoxy ethyl ether) to increase the solubility of tetranitromethane in the sodium hydroxide solution. For instance, the efficiency of a 0.5 N NaOH scrubbing solution containing 5 percent by volume 2,2-dimethoxy ethyl ether was 70 percent as compared with 50 percent for 0.5 N NaOH not containing any additives.

A second method of improving efficiency of an alkali metal hydroxide scrubbing solution is by adding a suitable surfactant. Surfactants containing sulfate groups, such as lauryl sulfate, form foams which interferred with the scrubbing process and provide very low efficiency. Similarly, fluorocarbon surfactants (e.g. 0.2% FC 98) provide only slight increases in efficiency. However, it has been found that polyoxyethylene (2) oleyl ether having the formula

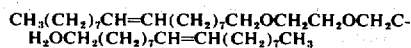

CH$_3$(CH$_2$)$_7$CH=CH(CH$_2$)$_7$CH$_2$OCH$_2$CH$_2$OCH$_2$C-H$_2$OCH$_2$(CH$_2$)$_7$CH=CH(CH$_2$)$_7$CH$_3$ increased the efficiency of a 0.5 N NaOH scrubbing solution to over 80 percent (see Examples IV and V). Apparently, this surfactant reduces the surface tension of the solution and allows the tetranitromethane to disperse more efficiently in the aqueous phase. Other surfactants with similar structures and similar chemical and physical properties should also be effective. For example, the length of the polyethoxyethylene bridge might be varied and the oleyl end groups may be replaced with similar hydrocarbon chains.

Although the use of surfactants or water soluble ethers improves the efficiency of the scrubbing process and thus the yield of trinitromethane, the basic reaction by which the tetranitromethane is converted into trinitromethane remains the same as that of a simple aqueous alkali metal hydroxide solution. This means that about 25 percent of the tetranitromethane removed from the exhaust gases will still be converted into carbonate ions rather than the desired trinitromethane or salts of trinitromethane.

It has been discovered in this invention that by using alcohol along with the alkali metal hydroxide scrubbing solutions, a yield of trinitromethane almost equal to the amount of tetranitromethane removed from the gas is achieved. Apparently, the following reactions

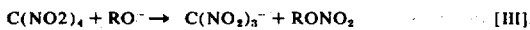

C(NO2)$_4$ + RO$^-$ → C(NO$_2$)$_3$$^-$ + RONO$_2$  [III]

takes place at a rate much faster than the side reaction represented by equation II.

Chemically, any alcohol should be operable. However, as a practical matter, the alcohols used must be suitable for outdoor ambient temperatures — at which most scrubbing operations are run. In winter in cold climates the alcohol must have a low enough melting point that it will not freeze. The term alcohol, as used here, means a single alcohol or mixture of alcohols. When a two phase scrubbing mixture containing a water insoluble alcohol is used, the term "alcohol" also includes mixtures of alcohols and ethers, hydrocarbons, etc. In summer, in warm climates, the alcohols used should be relatively nonvolatile.

Although low molecular weight polyhydric alcohols, such as ethylene glycol (see example VII), diethylene glycol (see example VI), and propylene glycol, offer high efficiency, high yield, and relatively low volatility, the polyhydric alcohols are less preferred than the monohydric alcohols because the nitrate esters of the polyhydric alcohols are less stable than those of the monohydric alcohols. In other words, the nitrate esters of the polyhydric alcohols present explosive hazards, particularly when they are formed in an industrial scale process.

For purposes of describing this invention it is convenient to classify the monohydric alcohols as either (1) totally soluble in water (i.e., miscible) or (2) either insoluble or only partially soluble in water. The alcohols in the first group will form a single phase scrubbing solution while the alcohols in the second group will form a two phase scrubbing mixture. Examples of suitable totally water soluble monohydric alcohols are methanol, ethanol, 1-propanol, and 2-propanol.

A single phase system formed by a water soluble monohydric alcohol presents several problems or disadvantages. First, the nitrate esters formed from the low molecular weight water soluble alcohols tend to be less stable than the nitrate esters of higher weight monohydric alcohols. Second, tetranitromethane is less soluble in an alcohol-water solution in a water insoluble alcohol. Moreover, salts forming in the aqueous phase of the scrubbing mixture further decrease the solubility of tetranitromethane in the aqueous phase; a comparison of examples VIII and IX illustrates this point. Finally, although the reaction represented by equation III is the dominant reaction, some of the tetranitroamethane will be converted by the reaction of equation II, resulting in a lower yield.

It has been further discovered in this invention that these problems can be eliminated or minimized by using a two phase scrubbing mixture composed of an aqueous alkali metal hydroxide phase and a separate alcohol phase. The alcohol phase is composed of an alcohol or alcohols which are partially soluble or else essentially insoluble in water. Partially soluble means that less than 15 grams, but preferably less than 1 gram, of alcohol dissolve in 100 grams of water at 20° C. Essentially insoluble means that less than 0.1 grams of alcohol dissolves in 100 grams of water at 20° C. Examples of partially soluble alcohols are 1-butanol, 1-pentanol, 1-hexanol, 1-heptanol, 1-octanol, 1-nonanol, 1-decanol, and 1-undecanol. Monohydric alcohols which branched hydrocarbon chains are also suitable, for example, 2-isobutyl alcohol, secondary butyl alcohol, isoamyl alcohol, 2-ethyl-1-butanol, 3-methyl-1-pentanol, 4-methyl-1-pentanol, 4-methyl-2-pentanol, 2,4,4-trimethyl-2-pentanol, etc., have suitable melting points and solubilities. More preferred are the following alcohols: 1-heptanol, 1-octanol, and 1-nonanol. These alcohols have melting points below 0° C, form more stable nitrate esters because they are primary alcohols with long carbon chains, and are essentially insoluble in water (less than 0.1 grams per hundred grams of water).

For winter operations, a water soluble alcohol phase with a low melting point can be achieved by (1) using alcohols with low melting points, (2) using mixtures of alcohols, or (3) adding other water insoluble liquid ingredients such as hydrocarbons or ethers. Also during the scrubbing operation alcohols are converted to nitrate esters which act as melting point depressants. It should be remembered, however, that the temperatures at which the scrubbing process may be conducted is also limited by the freezing point of the aqueous phase (at or about 0° C).

The two phase aqueous alkali metal hydroxide — alcohol scrubbing mixture works as follows. Tetranitromethane is very soluble in the relatively nonpolar alcohol phase and is readily removed from the waste gases by the alcohol. The tetranitromethane is converted into trinitromethane ions by the following overall reaction:

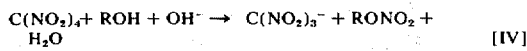

$$C(NO_2)_4 + ROH + OH^- \rightarrow C(NO_2)_3^- + RONO_2 + H_2O \quad [IV]$$

which occurs at the interfaces between the aqueous and the alcohol phases. The trinitromethane and the alcohol ROH are supplied by the alcohol phase and the hydroxyl ions are supplied by the aqueous phase. The trinitromethide ions are taken up into the aqueous phase as a soluble alkali metal salt, while the nitrate ester, $RONO_2$, dissolves into the alcohol phase. Note that the alcohol phase not only removes the tetranitromethane from the waste gases, but it also traps or holds the tetranitromethane long enough for it to be converted into the alkali metal trinitromethide salt.

If lower yields of trinitromethane are suitable, other water-insoluble solvents may be substituted for the alcohol in the two phase scrubbing mixture. These solvents must satisfy the following criteria: (1) they must dissolve tetranitromethane readily; (2) they must be relatively nonvolatile — preferably having a boiling point of over 150° C; and (3) they must have a melting point which is below 0° C. Obviously, the solvent used must have a viscosity suitable for scrubbing operations and must be chemically compatible with the aqueous alkali metal hydroxide phase. Solvents which are suitable include water insoluble ethers such as dibenzl ether, alkyl substituted aromatic compounds such as n-butyl benzene, halo substituted aromatic compounds, such as m-dichlorobenzene, or hydrocarbons or hydrocarbon mixtures such as kerosene.

Finally, note that the scrubbing process of the present invention is intended to supplement, and not to replace, the water and sulfuric acid scrubbing process. Preferably, the waste gases should be scrubbed first with the sulfuric acid scrubbing solution to remove the nitrogen oxides and then be treated with the process of the present invention. In this way the formation of salts in the scrubbing solution or mixture of the present invention will be minimized.

The general nature of the invention having been set forth, the following examples are presented as specific illustrations thereof. It will be understood that the invention is not limited to these examples but is susceptible of different modifications that will be readily recognized by one or ordinary skill in the art.

FOR EXAMPLES I THROUGH IX

A glass scrubber 2 inches in diameter and packed with pyrex helices to a height of 12 inches was used in these experiments. The liquid scrubbing solution or mixture was cycled down through the scrubber while an air stream containing tetranitromethane was passed up the scrubber countercurrent to the liquid scrubbing mixture flow. The conditions in the following examples were adjusted to correspond in scale to actual conditions found at the Radford Army Ammunition Plant, Radford, Virginia.

In these examples, efficiency refers to the percentage of tetranitromethane which was removed from the air stream. Yield refers to the percentage of tetranitromethane which was removed from the air stream and converted into nitroform or one of its salts.

EXAMPLE I

The scrubber reservoir was charged with 243 ml. of 0.41 N NaOH which was circulated through the scrubber at a rate of 910 cc/min. An air stream containing 400 PPM (V/V) of tetranitromethane was passed up through the scrubber countercurrent to the NaOH solution at a rate of 6 cubic feet per hour. After 6 hours the aqueous solution was collected and analyzed. The yield of nitroform was 39 percent; the efficiency was 52 percent.

EXAMPLE II

The scrubber reservoir was charged with 245 ml. of 0.5 N NaOH which was circulated through the scrubber at a rate of 910 cc/min. An air stream containing 400 PPM (V/V) of tetranitromethane was passed up through the scrubber countercurrent to the sodium hydroxide solution at a rate of 6 cubic feet per hour. After 6 hours the aqueous solution was collected and analyzed. It was found that 50 percent of the tetranitromethane had been removed from the air. The yield of trinitromethane was 37 percent.

EXAMPLE III

The scrubber reservoir was charged with 248 ml. of 0.5 N NaOH containing 5 percent 2,2-dimethoxy ethyl ether which was circulated through the scrubber at a rate of 910 cc/min. An air stream containing 400 PPM (V/V) of tetranitromethane was passed up through the scrubber countercurrent to the sodium hydroxide solution at a rate of 6 cubic feet per hour. After 6 hours the aqueous solution was collected and analyzed. The efficiency was 70 percent and the yield was 53 percent.

EXAMPLE IV

The scrubber reservoir was charged with 247 mls. of 0.54 N NaOH containing 0.5 percent of polyoxyethylene (2) oleyl ether, $CH_3(CH_2)_7CH=CH(CH_2)_7CH_2OCH_2CH_2OCH_2C-H_2OCH_2(CH_2)_7CH=CH(CH_2)_7CH_3$, which was circulated through the scrubber at a rate of 910 cc/min. An air stream containing 400 PPM (V/V) of tetranitromethane was passed up through the scrubber countercurrent to the sodium hydroxide solution at a rate of 6 cubic feet per hour. After 6 hours the aqueous solution was collected and analyzed. The efficiency was 86 percent and the yield of nitroform was 65 percent.

EXAMPLE V

The scrubber reservoir was charged with 260 ml. of 0.5 N NaOH containing 1 percent of the polyoxyethylene (2) oleyl used in Example IV. This liquid solution was circulated through the scrubber at a rate of 910 cc/min. An air stream containing 400 PPM (V/V) of tetranitromethane was passed up through the scrubber countercurrent to the liquid solution at a rate of 6 cubic feet per hour. After 6 hours the aqueous solution was collected and analyzed. The yield of trinitromethane was 62 percent and the efficiency was 83 percent.

EXAMPLE VI

The scrubber reservoir was charged with 246 ml of 0.5 N NaOH containing 11 percent of diethylene glycol, $CH_2OHCH_2OCH_2CH_2OH$, and this liquid solution was circulated through the scrubber at a rate of 910 cc/min. An air stream containing 400 PPM (V/V) of tetranitromethane was passed up through the scrubber countercurrent to the liquid solution at a rate of 6 cubic feet per hour. After 6 hours the aqueous solution was collected and analyzed. The efficiency was 80 percent and the yield of trinitromethane was 74 percent.

EXAMPLE VII

The scrubber reservoir was charged with 245 ml. of 0.5 N NaOH containing 5.6 percent of ethylene glycol, $CH_2OHCH_2OH$, and this liquid solution was circulated through the scrubber at a rate of 910 cc/min. An air stream containing 400 PPM (V/V) of tetranitromethane was passed upon through the scrubber countercurrent to the liquid solution at a rate of 6 cubic feet per hour. After 6 hours the aqueous solution was collected and analyzed. The efficiency was 73 percent and the yield of trinitromethane was 70 percent.

EXAMPLE VIII

The scrubber reservoir was charged with 260 ml. of 0.5 N NaOH containing 37 grams of $NaNO_2$, 22.5 grams of $NaNO_3$, and 10 grams of $Na_2CO_3$. This liquid solution was cycled through the scrubber at a rate of 910 cc/min. An air stream containing 400 PPM (V/V) of tetranitromethane was passed up through the scrubber countercurrent to the liquid solution at a rate of 6 cubic feet per hour. After 6 hours the aqueous solution was collected and analyzed. The efficiency was 31.5 percent and the yield of trinitromethane was 23.6 percent.

EXAMPLE IX

The scrubber was charged with 210 ml. of 1 N NaOH and 55 ml. of primary n-octyl alcohol (i.e., 1-octanol), $CH_3(CH_2)_6 CH_2OH$ which is a water insoluble high boiling alcohol. Thus, the scrubbing mixture constituted a two phase system with the aqueous NaOH solution constituting one phase and the alcohol constituting the second phase. This two phase scrubbing mixture was circulated through the scrubbing tower at a rate of 910 cc/min. An air stream containing 504 PPM (V/V) of tetranitromethane was passed up through the scrubbing tower countercurrent to the two phase scrubbing mixture at a rate of 4.5 cubic feet per hour. An amount of NaOH equivalent to the amount of trinitromethane (removed from the air stream) was added after each 24 hour period during the run. After 72 hours an additional 10 ml. of the 1-octanol was added. After 114 hours the aqueous solution was collected and analyzed. The yield of trinitromethane was 83 percent and therefore the efficiency was equal to or greater than 83 percent.

Obviously, many modifications and variations of this invention are possible in the light of the above teachings. It is therefore to be understood that within the scope of the appended claims the invention may be practiced otherwise than as specifically described.

What is claimed as new and desired to be secured by Letters Patent of the United States is:

1. A gas scrubbing process for removing tetranitromethane from trinitrotoluene plant waste gases comprising:
    scrubbing the waste gases with a two phase mixture comprising (1) an alkali metal hydroxide, (2) water, and (3) a water insoluble solvent selected from the group consisting of (a) ethers, (b) alkyl aromatic compounds, (c) halo aromatic compounds, (d) hydrocarbons, and (e) mixtures thereof;
    provided that the two phase mixture is circulated countercurrent to the flow of the waste gases.
2. The process of claim 1 wherein the alkali metal hydroxide concentration is from 0.1 N to 3 N.
3. The process of claim 2 wherein the alkali metal hydroxide concentration is from 0.5 N to 1 N.
4. The process of claim 3 wherein the alkali metal hydroxide is selected from the group consisting of NaOH, KOH, and mixtures thereof.
5. The process of claim 4 wherein the alkali metal hydroxide is NaOH.
6. A gas scrubbing process for removing tetranitromethane from trinitrotoluene plant waste gases comprising:
    scrubbing the waste gases with a two phase mixture comprising (1) an alkali metal hydroxide, (2) water, and (3) a liquid monohydric alcohol having a solubility of less than 15 grams per 100 grams of water at 20° C;
    provided that the two phase mixture is circulated countercurrent to the flow of the waste gases.
7. The process of claim 6 wherein the alkali metal hydroxide concentration is from about 0.1 N to about 3 N.
8. The process of claim 7 wherein the alkali metal hydroxide concentration is from 0.5 N to 1 N.
9. The process of claim 8 wherein the alkali metal hydroxide is selected from the group consisting of NaOH, KOH, and mixtures thereof.
10. The process of claim 9 wherein the alkali metal hydroxide is NaOH.
11. The process of claim 6 wherein the alcohol has a solubility of less than 1 gram per 100 grams of water at 20° C.
12. The process of claim 11 wherein the alkali metal hydroxide concentration is from about 0.1 to about 3 N.
13. The process of claim 12 wherein the alkali metal hydroxide concentration is from 0.5 N to 1 N.
14. The process of claim 13 wherein the alkali metal hydroxide is selected from the group consisting of NaOH, KOH, and mixtures thereof.
15. The process of claim 14 wherein the alkali metal hydroxide is NaOH.
16. The process of claim 11 wherein the alcohol is selected from the group consisting of n-heptanol, n-octanol, n-nonanol, and mixtures thereof.

17. The process of claim 16 wherein the alkali metal hydroxide concentration is from about 0.1 N to about 3 N.

18. The process of claim 17 wherein the alkali metal hydroxide concentration is from 0.5 N to 1 N.

19. The process of claim 18 wherein the alkali metal hydroxide is selected from the group consisting of NaOH, KOH, and mixture thereof.

20. The process of claim 19 wherein the alkali metal hydroxide is NaOH.

21. The process of claim 6 wherein a compound selected from the group consisting of (a) water insoluble ethers, (b) saturated aliphatic hydrocarbons, and mixtures thereof is added to the water insoluble alcohol phase to depress the melting point of the alcohol.

* * * * *